United States Patent
Freeze

(10) Patent No.: US 9,412,474 B2
(45) Date of Patent: Aug. 9, 2016

(54) METHOD AND APPARATUS FOR COMPRESSING PLASMA TO A HIGH ENERGY STATE

(71) Applicant: Brent Freeze, Irvine, CA (US)

(72) Inventor: Brent Freeze, Irvine, CA (US)

( * ) Notice: Subject to any disclaimer, the term of this patent is extended or adjusted under 35 U.S.C. 154(b) by 130 days.

(21) Appl. No.: 14/215,493

(22) Filed: Mar. 17, 2014

(65) Prior Publication Data

US 2016/0196882 A1    Jul. 7, 2016

Related U.S. Application Data

(62) Division of application No. 12/932,641, filed on Mar. 1, 2011.

(51) Int. Cl.
*G21B 1/05* (2006.01)
*G21B 1/17* (2006.01)

(52) U.S. Cl.
CPC . *G21B 1/057* (2013.01); *G21B 1/17* (2013.01)

(58) Field of Classification Search
USPC .......................................................... 376/133
See application file for complete search history.

(56) References Cited

U.S. PATENT DOCUMENTS

| 4,000,036 A | 12/1976 | Ensley |
| 2010/0046687 A1 | 2/2010 | Rostoker et al. |
| 2011/0142185 A1* | 6/2011 | Woodruff ................. G21B 1/05 376/121 |

OTHER PUBLICATIONS de la Cal et al., "First-wall cleaning and isotope control studies by D2 ICRF conditioning in Tore Supra with a permanent magnetic field." Plasma Phy. Control. Fusion 39 (1997) 1083-1099.
Myra et al., "Nonlinear ICRF-plasma interactions" Nuclear Fusion 46 (2006) 5455-5468.

* cited by examiner

*Primary Examiner* — Sean P Burke
(74) *Attorney, Agent, or Firm* — James E. Brunton

(57) ABSTRACT

A compressor assembly and the method of using the same which includes an elongated spiral passageway within which a compact toroid plasma, such as a compact toroid plasma structure, can be efficiently compressed to a high-energy state by compressing the compact toroid plasma structure by its own momentum against the wall of the spiral passageway in a manner to induce heating by conservation of energy. The compressor assembly also includes a burn chamber that is in communication with the spiral passageway and into which the compressed compact toroid plasma structure is introduced following its compression.

6 Claims, 12 Drawing Sheets

| Mechanism | Equation | No. |
|---|---|---|
| Electron "free-free" Bremsstrahlung Radiation | $P_{ff} = 2^5 \left( \dfrac{2kT_e}{\pi m_e c^2} \right)^{0.5} \alpha r_e^2 n_e^2 c \left( \dfrac{1}{3} m_e c^2 n_i Z^2 g_{ff} + kT_e \right)$ | A.2 |
| Electron "free-bound" Recombination Radiation | $P_{fb} = \sum_{n=1}^{10} \int_{\frac{Z^2 R_y}{n^2 k}}^{-Hz} n_e n_i Z^2 \left( \dfrac{e_0^2}{4\pi\varepsilon_0} \right)^3 \dfrac{16\pi}{3\sqrt{3} m_e^2 c^3} \left( \dfrac{2m_e}{\pi kT_e} \right)^{0.5} e^{\frac{-\hbar\omega}{2\pi kT_e}} \left( \dfrac{Z^2 R_y}{kT_e} \cdot \dfrac{2}{n^3} g_{fb} e^{\frac{Z^2 R_y}{n^2 kT_e}} \right) d\omega$ | A.3 |
| Electron "bound-bound" Line Radiation | $P_{bb} = 4\pi^{0.5} \alpha a_0^2 c E_H \left( \dfrac{E_H}{kT_e} \right)^{0.5} n_e N_a e^{\left( -\frac{E_2}{kT_e} \right)}$ | A.4 |
| Electron Synchrotron Radiation | $P_{sy} = \left( \dfrac{e_0 B}{m_e} \right)^2 \dfrac{e_0^2 n_e}{3\pi c \varepsilon_0} \left( \dfrac{kT_e}{m_e c^2} \right) \left( 1 + \dfrac{5}{2} \dfrac{kT_e}{m_e c^2} \right) K_L$ | A.5 |
| Electron Thermal Conduction | $P_{ec} = \dfrac{1}{V} \left( \dfrac{A_w}{t} \int_0^t -\kappa_{ew} \dfrac{d}{dr} T_p(r_w,\theta) d\theta - \beta_e j_e T_e \right)$ | A.6 |
| Magnetic Flux Density Dissipation | $D_B = \dfrac{1}{t} \int_0^t (\gamma - 1) \dfrac{1}{\mu_0^2 \sigma_\parallel} \left( \dfrac{d}{dr} \Psi(r_0,\theta,L_i) \right)^2 d\theta$ | A.7 |

FIG. 10

| Mechanism | Equation | No. |
|---|---|---|
| Ion Thermal Conduction | $P_{ic} = \dfrac{A_w}{Vt} \int_0^t -\kappa_{iw} \dfrac{d}{dr} T_p(r_w,\theta)\, d\theta$ | A.8 |
| Ion-Neutral Particle Drag | $P_D = \tfrac{1}{2} m_i V n_i \int_{-c}^{c} \left(\dfrac{m_i}{2\pi k T_i}\right)^{0.5} \exp\left(-\dfrac{(v-v_d)^2}{v_i^2}\right) v_i^2 n_{gas} \sigma_m\, dv$ | A.9 |
| Ion Bremsstrahlung Radiation | $P_{ffi} = 2^5 \left(\dfrac{2kT_i}{\pi m_i c^2}\right)^{0.5} \alpha r_i^2 n_i^2 c k T_i$ | A.10 |
| Ion Synchrotron Radiation | $P_{syi} = \left(\dfrac{Z e_0 B}{m_i}\right)^2 \dfrac{Z^2 e_0^2 n_i}{3\pi c \varepsilon_0} \left(\dfrac{kT_i}{m_i c^2}\right)\left(1+\dfrac{5}{2}\dfrac{kT_i}{m_i c^2}\right) K_L$ | A.11 |
| Ion-to-Electron Kinetic Transfer Collisions | $P_{ie} = \dfrac{\tfrac{3}{2}n_i kT_i - \tfrac{3}{2}n_e kT_e}{\tau_{ie}} \sqrt{\dfrac{2}{\pi}} \dfrac{Kn_2\left(\tfrac{m_e c^2}{kT_e}\right) e^{\left(\tfrac{m_e c^2}{kT_e}\right)} \left(\tfrac{m_e c^2}{kT_e}\right)^{0.5}}{1+2\dfrac{kT_e}{m_e c^2}+2\left(\dfrac{kT_e}{m_e c^2}\right)^2}$ | A.12 |
| Product Energy Ion Apportionment | $f = \dfrac{\int_{kT_i}^{Q_P}\left[1+\dfrac{4}{3\sqrt{\pi}}\left(\dfrac{W_P}{kT_e}\right)^{\tfrac{3}{2}}\dfrac{\ln(\Lambda_e)}{\ln(\Lambda_i)}\left(\dfrac{m_e}{m_P}\right)^{0.5}\dfrac{n_e}{m_P N Z}\right]^{-1} dW_P}{Q_P}$ | A.13 |
| Product Energy Ion Thermalization | $\Delta_\varepsilon = H(B,r_w,\Delta r) + \dfrac{T(B,r_w,\Delta r)}{Q_P} - \dfrac{e^4 Z_P^2}{4\pi\varepsilon_0^2 v_P}\left[\dfrac{n_i Z^2 \ln(\Lambda_i)}{m_i}\left(\mathrm{erf}(X_i)-\dfrac{2}{\sqrt{\pi}}\left(1+\dfrac{m_i}{m_P}\right)X_i \exp(-X_i^2)\right)+\dfrac{n_e \ln(\Lambda_e)}{m_e}\left(\mathrm{erf}(X_e)-\dfrac{2}{\sqrt{\pi}}\left(1+\dfrac{m_e}{m_P}\right)X_e \exp(-X_e^2)\right)\right]$ | A.14 |

FIG. 11

| Mechanism | Equation | No. |
|---|---|---|
| Ion Particle Diffusion | $D_{ie} = \dfrac{A_s}{Vt}\displaystyle\int_0^t -D_e\left(1+\dfrac{T_i}{T_e}\right)\left(\dfrac{d}{dr}\varphi\left(r_w,\theta,D_e\left(1+\dfrac{T_i}{T_e}\right),r_{ci}\right)\right)d\theta$ | A.15 |
| Wall Impurity Ion Sputtering | $Y_S = q \cdot s_{nKRC}\left(\varepsilon \dfrac{\left(\dfrac{E_0}{E_{th}}-1\right)^\mu}{\lambda + \left(\dfrac{E_0}{E_{th}}-1\right)^\mu}\left(D_{ie}V\right)\right.$ | A.16 |
| Ion Product Particle Thermalization | $\Delta_P = H(B,r_w,\Delta r) + T(B,r_w,\Delta r) \cdot n_P \sigma_{cs}\sqrt{\dfrac{2Q_P}{m_P}}$ | A.17 |

FIG. 12

METHOD AND APPARATUS FOR COMPRESSING PLASMA TO A HIGH ENERGY STATE

CROSS-REFERENCE TO RELATED APPLICATIONS

This is a Divisional Application claiming the benefit of co-pending application Ser. No. 12/932,641 filed on Mar. 1, 2011.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to the field of plasma physics. More particularly, the invention concerns a method and apparatus for compressing plasma to a high energy state.

2. Description of Related Art Including Information Disclosed Under 37 CFR 1.97 and 1.98

By way of brief background, in 1942, Enrico Fermi began discussing the idea of joining light nuclei by nuclear fusion to generate a large source of energy. He suggested burning deuterium, an abundant stable-isotope of hydrogen.

Today, the two primary approaches to the problem of achieving fusion power production have been Magnetic Confinement (MCF) and Laser Inertial Confinement (ICF) demonstration devices, such as the International Thermonuclear Experimental Reactor (ITER) tokamak that uses MCF or the National Ignition Facility (NIF) that uses ICF. These plasma experiments scale to very large sizes, measuring double-digit meters across.

Reactors based on these approaches scale to even larger sizes because they occupy either extreme of the density conditions necessary to fulfill the Lawson criterion for simultaneously achieving an energetic plasma for sufficient duration. MCF attempts to sustain a low-density $10^{20}$ $m^{-3}$ plasma for a long duration of about 2 to 4 seconds, using external magnetic fields, but suffers from plasma instabilities. ICF attempts to hold a high-density $10^{28}$ $m^{-3}$ plasma for nanoseconds. Magnetized Target Fusion (MTF) mitigates the problems encountered at either extreme by sustaining a medium-density $10^{24}$ $m^{-3}$ plasma for only several milliseconds, while simultaneously reducing the minimum reactor size and cost as compared to MCF or ICF.

Los Alamos National Laboratory (LANL) began early research into MTF, but became hampered by the impetus to scale their experiments to use the nearby Shiva Star capacitor bank as a power source, instead of scaling by best available theory and experiment. The Shiva Star facility is located at Kirtland Air Force Base in Albuquerque, N. Mex. They did not optimize their proof-of-principle design based on physics, but rather on their power supply limitations. Another weakness in their approach was the use of a theta pinch, instead of a more efficient antenna method to form a Compact Torus (CT) plasma structure. Lastly, they adhere to a non-reusable compression method (an aluminum can crusher), for single-shot experimentation.

A Canadian company improved upon this earlier implementation and attempted a smaller-scale MTF approach, one with lower input energy needs. However, this approach introduced high-atomic-number impurities (such as lead) that quench the plasma by radiation losses before ignition occurs. Controlling the timing of the acoustic-compression method of this company is also problematic.

The California Institute of Technology and Lawrence Livermore National Laboratory (LLNL) focused on injecting a compact torus (CT) into a tokamak, to sustain the latter. Their prototype 'Compact Torus Accelerator' experiment showed that it was possible to both translate and compress a compact torus plasma structure by moving it relative to a tapered wall. However, they also experienced impurity problems (iron from steel electrodes) and did not attempt to extend their initial achievement to a curved geometry, such as a spiral.

The University of Washington Plasma Physics Laboratory has long advocated cleanliness requirements to avoid plasma impurities. They also utilize newer and more efficient methods to form and accelerate compact toroids. However, the pure research of the University is not focused on advanced plasma compression for MTF and the University has not attempted to translate a CT along a curved wall made of beryllium or lithium-silicon, which are much lower-Z materials than their walls (made of silicon dioxide).

Prior art compact toroid compression mechanisms, include, but are not limited to the following:

a. Explosive (liner technology)—For example the Los Alamos/Shiva Star and like projects. Such mechanisms are not reusable, require high input energy requirements and necessitate large system size.

b. Pneumatic (gas injection)—Such mechanisms typically exhibit pressure instabilities and are generally too slow for large plasmas.

c. Hydraulic (hydro-forming wall)—For example, the Canadian 'General Fusion' MTF concept. Such mechanisms, which require sub-microsecond-precision timing, require highly complex control systems. Also, the liquid walls of such mechanisms add high-atomic-number contaminants to the plasma that significantly increase radiation loss rates from the plasma.

d. Mechanical (piston)—For example, the Canadian 'General Fusion' concept. Such mechanisms, which require repetitive sub-microsecond timing, require highly complex control systems.

e. Electrical (relay-piston)—For example, the Canadian 'General Fusion' concept. Such mechanisms, which require repetitive sub-microsecond timing require highly complex control systems.

f. Magnetic (coil-current spike)—This mechanism has been tried in connection with many research programs, from the early TRISOPS (experiment at the University of Florida) to the University of Washington Plasma Physics Laboratory's latest CT devices. Such mechanisms require good timing, a large energy input, and may induce a plasma instability.

BRIEF SUMMARY OF THE INVENTION

The thrust of the present invention is to provide a compact toroid plasma structure compression assembly that is superior to and overcomes the problems associated with the various mechanisms described in the preceding paragraphs. More particularly, through analysis of the disadvantages of the aforementioned prior approaches, it has been possible to derive a unique set of design features that yield a novel approach with a distinct advantage. The details of these novel design features will be described further in the specification that follows.

With the foregoing in mind, it is an object of the present invention to provide a compressor assembly of novel design within which a plasma can be efficiently compressed to a high energy state.

More particularly, it is an object of the invention to provide a compressor assembly of the aforementioned character, which includes an elongated spiral passageway within which a compact toroid (CT) plasma structure can be efficiently compressed to a high-energy state by compressing the CT using its own momentum against the wall of the spiral passageway in a manner to induce heating by conservation of energy.

Another object of the invention is to provide a compressor assembly of the character described in the preceding paragraph, which includes a burn chamber that is in communication with the spiral passageway and into which the compressed CT is introduced following its compression.

Another object of the invention is to provide a burn chamber of the character described in the preceding paragraph, in which a magnetic sensor is embedded in the burn chamber for measuring the magnetic field vector versus time.

Another object of the invention is to provide a compressor assembly of the character described in the preceding paragraph, in which the burn chamber comprises a toroidal ring of constant cross-section, having at least one entrance port for receiving the compressed CT and having a multiplicity of smaller exhaust ports.

Another object of the invention is to provide a method for compressing a CT to a high-energy state using a compressor having an elongated spiral passageway by injecting the CT into the spiral passageway in a manner to avoid ricochet of the CT along the walls of the passageway. More particularly, in accordance with the method of the invention, ricochet is avoided by ensuring that the bulk axial kinetic energy of the CT at the point of injection is greater than the design "target" thermal energy sought to be achieved at the end of compression.

Another object of the invention is to provide a method of the character described in the preceding paragraph in which thermal conduction losses and particle diffusion losses are avoided by embedding a large magnetic field within the CT during formation, prior to launching the CT into the elongated spiral passageway. A highly magnetized CT impedes both thermal conduction losses and particle diffusion losses perpendicular to the embedded magnetic field lines.

Another object of the invention is to provide a method of the character described in the preceding paragraphs, in which thermal conduction losses and particle diffusion losses are avoided by applying a plasma-impurity impeding coating to the walls of the elongated spiral passageway. Examples of these coatings include low atomic number materials, such as beryllium or lithium-silicon.

Another object of the invention is to provide a method of the character described in the preceding paragraphs in which, following compression of the CT to the design "target" thermal energy, the CT is introduced into a burn chamber comprising a toroidal ring of constant cross-section having at least one entrance port for the compressed CT and having a multiplicity of smaller exhaust ports.

Another object of the invention is to provide a method of the character described in which, following compression of the CT to the design "target" thermal energy, the CT is introduced into a burn chamber and after the burn is complete, the compressed CT is caused to dissipate into a neutral gas, which is pumped out of the burn chamber by means of a suitable vacuum pump.

The forgoing as well as other objectives of the invention will be achieved by the apparatus illustrated in the attached drawings and described in the specification which follows.

BRIEF DESCRIPTION OF SEVERAL VIEWS OF THE DRAWINGS

FIG. 4A is a cross-sectional view taken along lines 4A-4A of FIG. 4.

FIG. 10 is a list of loss equations for electrons.

FIG. 11 is a list of loss equations for ions.

FIG. 12 is a list of loss equations for particle transfer.

DETAILED DESCRIPTION OF THE INVENTION

Figure 1:
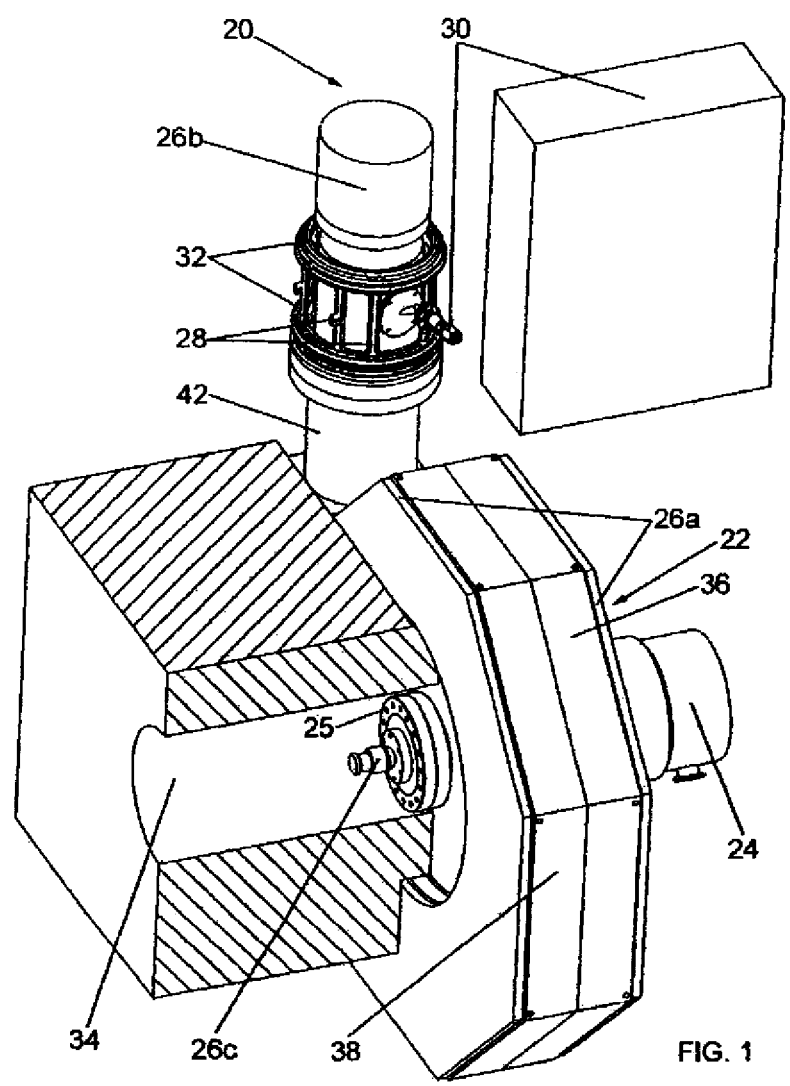
FIG. 1 is a generally perspective view of one form of the apparatus of the invention for compressing plasma to a high energy state.

DEFINITIONS
As used herein, the following symbols have the following meanings:

| Symbol | Meaning |
| --- | --- |
| $a_0$ | Bohr radius |
| $a_{12}$ | ½ for single reactant, otherwise 1 |
| $A_s$ | plasma surface area |
| $A_w$ | wall surface area |
| B | magnetic flux density |
| c | speed of light |
| D | deuterium |
| $D_e$ | electron particle diffusivity |
| $e_0$ | elementary charge |
| $E_0$ | incoming ion energy for sputtering |
| $E_2$ | electron allowed energy states |
| $E_H$ | hydrogen ground state energy |
| $E_{th}$ | sputtering threshold energy |
| $g_{fb}$ | free-bound gaunt factor |
| $g_{ff}$ | free-free gaunt factor |
| h | Planck constant |

-continued

DEFINITIONS
As used herein, the following symbols
have the following meanings:

| Symbol | Meaning |
|---|---|
| H | hydrogen |
| He | helium |
| $j_e$ | electron sheath current to wall |
| k | Boltzmann constant |
| $K_L$ | total transparency factor |
| $Kn_2$ | 2nd-order Bessel function |
| $L_i$ | ion inertial length |
| $m_e$ | electron mass |
| $m_i$ | ion mass |
| $m_P$ | product ion mass |
| n | neutron, or principal quantum no. |
| $n_1, n_2$ | respective reactant densities |
| $n_e$ | electron density |
| $n_{gas}$ | neutral gas density |
| $n_i$ | ion density |
| $n_P$ | reactant ion particle density |
| $N_a$ | ion density * fractional ionization |
| NZ | reactant ion density * charge/mass |
| q | absolute sputtering yield |
| $Q_P$ | reaction product energy |
| r | radius |
| $r_0$ | field null radius |
| $r_{ci}$ | ion cyclotron radius |
| $r_e$ | classical electron radius |
| $r_i$ | ion radius |
| $r_w$ | wall radius |
| $R_y$ | Rydberg energy |
| $S_{nKRC}$ | stopping power for KrC potential |
| t | time step duration |
| T | tritium |
| $T_e$ | electron temperature |
| $T_i$ | ion temperature |
| $T_p$ | transient radial temp. profile |
| $v_d$ | ion velocity distribution |
| $v_i$ | ion most-probable thermal speed |
| $v_P$ | reaction product ion velocity |
| V | plasma volume |
| $W_P$ | variable of integration for energy |
| Z | average ion charge in plasma |
| $Z_P$ | ion product charge |
| $\alpha$ | fine-structure constant |
| $\beta_e$ | thermoelectric coefficient |
| $\gamma$ | ratio of specific heats |
| $\Delta r$ | plasma effective thickness |
| $\epsilon$ | reduced energy for sputtering |
| $\epsilon_0$ | electric permittivity of free space |
| H | product particles fraction that stay |
| $\theta$ | variable of integration for time |
| $\kappa_{ew}$ | electron-wall thermal conductivity |
| $\kappa_{iw}$ | ion-wall thermal conductivity |
| $\lambda$ | sputtering decrease at low energy |
| $\Lambda_e$ | plasma parameter for electrons |
| $\Lambda_i$ | plasma parameter for ions |
| $\mu$ | sputtering decrease fit parameter |
| $\mu_0$ | magnetic permeability free space |
| $\pi$ | geometric pi |
| $\sigma_{cs}$ | beam reaction cross-section |
| $\sigma_m$ | momentum transfer cross-section |
| $\sigma_\parallel$ | electric conductivity parallel B |
| $<\sigma v>$ | integrated reaction cross-section |
| $\tau_{ie}$ | ion-electron equilibration time |
| T | time that lost product particles stay |
| $\phi$ | radial particle profile in time |
| $X_e$ | electrons to products velocity ratio |
| $X_i$ | ions to products velocity ratio |
| $\Psi$ | magnetic flux radial profile in time |

Fusion

The process by which two light nuclei combine to form a heavier one. The fusion process releases a tremendous amount of energy in the form of fast moving particles. Because atomic nuclei are positively charged—due to the protons contained therein—there is a repulsive electrostatic, or Coulomb, force between them. For two nuclei to fuse, this repulsive barrier must be overcome, which occurs when two nuclei are brought close enough together where the short-range nuclear forces become strong enough to overcome the Coulomb force and fuse the nuclei. The energy necessary for the nuclei to overcome the Coulomb barrier is provided by their thermal energies, which must be very high. For example, the fusion rate can be appreciable if the temperature is at least of the order on 10 keV—corresponding roughly to 100 million degrees Kelvin. The rate of a fusion reaction is a function of the temperature, and it is characterized by a quantity called reactivity. The reactivity of a D-T reaction, for example, has a broad peak between 30 keV and 100 keV.

Field-Reversed Configuration (FRC)

An example of a compact toroid plasma structure is a Field-Reversed Configuration which is formed in a cylindrical coil which produces an axial magnetic field. First, an axial bias field is applied, then the gas is pre-ionized, which "freezes in" the bias field, and finally the axial field is reversed. At the ends, reconnection of the bias field and the main field occurs, producing closed poloidal magnetic field lines. A review well known to those skilled in the art is found in "Field Reversed Configurations," M. Tuszewski, Nuclear Fusion, Vol. 28, No. 11, (1988), pp. 2033-2092.

Compact Toroid

The FRC belongs to the family of compact toroids. "Compact" implies the absence of internal material structures (e.g. magnet coils) allowing plasma to extend to the geometric axis. "Toroid" implies a topology of closed donut-shaped magnetic surfaces. The FRC is differentiated from other compact toroids by the absence of an appreciable toroidal magnetic field within the plasma.

Prime-Mover Subsystem

As used herein, prime-mover subsystem means a system for converting fusion-generated ion and/or neutron thermal energy to electrical energy. The prime-mover subsystem may comprise a heat exchanger and may also comprise various types of selected direct-conversion subsystems of a character also well known by those skilled in the art.

The Apparatus of the Invention

Referring now to the drawings and particularly to FIG. 1, one form of the apparatus of the invention for compressing plasma to a high energy state is there shown and generally designated by the numeral 20. This form of the apparatus comprises a compressor 22, a vacuum pump subsystem 24 connected to the compressor by an outlet port 25 and a wall-cleaning subsystem that is operably associated with the compressor. The wall-cleaning subsystem here comprises heater blankets 26a, such as those readily commercially available from BH Thermal Corporation of Columbus, Ohio and like sources, a glow discharge cleaning (GDC) system 26b such as a system that is readily commercially available from XEI Scientific, Inc. of Redwood City, Calif. and an ion gettering pump 26c of the character readily available from commercial sources such as SAES Getters USA of Colorado Springs, Colo. Apparatus 20 also includes a plasma source subsystem 28 that here comprises stator antenna coils with pre-ionization capability, such as those commercially available from sources such as Alpha Magnetics of Hayward, Calif., a gas pulse injection valve with fire control unit 30 of the character that is available from Parker Hannifin of Pine Brook, N.J., and a ejector coil subsystem 32 that is also available from Alpha Magnetics. The pre-ionization process is preferably powered by a radiofrequency generator of the character that can be obtained from T & C Power Conversion of Rochester, N.Y. As will be discussed in greater detail in the paragraphs that follow, a prime-mover subsystem, which is generally designated in FIG. 1 by the numeral 34, must be operably associated with a compressor 22 to convert the fusion-generated ion and/or neutron thermal energy to electrical energy. Prime-mover 34 here comprises a heat exchanger of a character well understood by those skilled in the art. Attached to the heat exchanger is a steam turbine, which is, in turn, attached to an electrical generator (not separately shown in the drawings). The prime-mover subsystem can also comprise various types of selected direct-conversion subsystems of a character also well known by those skilled in the art.

Figure 2:
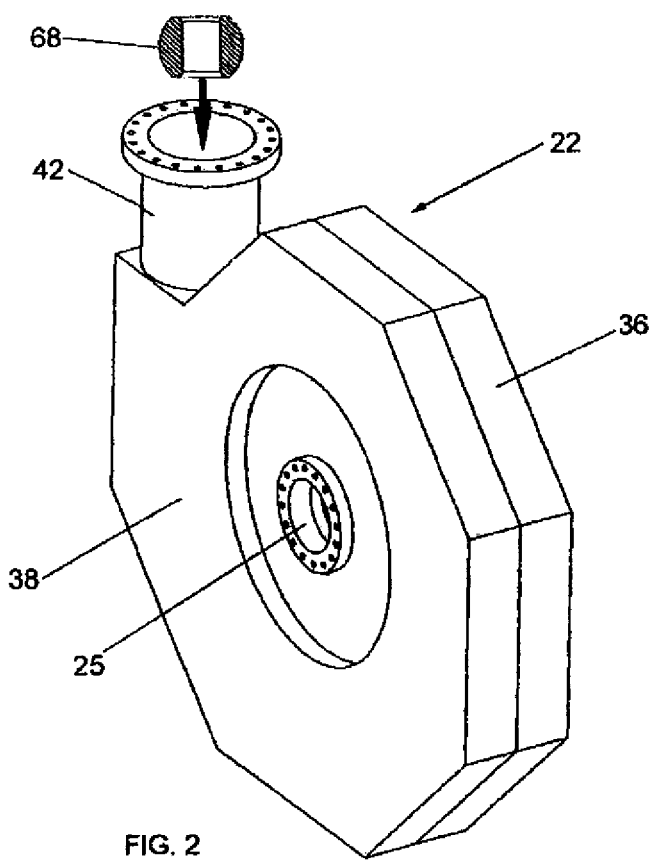
FIG. 2 is a generally perspective exploded view of one form of the plasma compressor of the apparatus showing the plasma structure to be compressed in position to be introduced into the plasma compressor.
Figure 3:
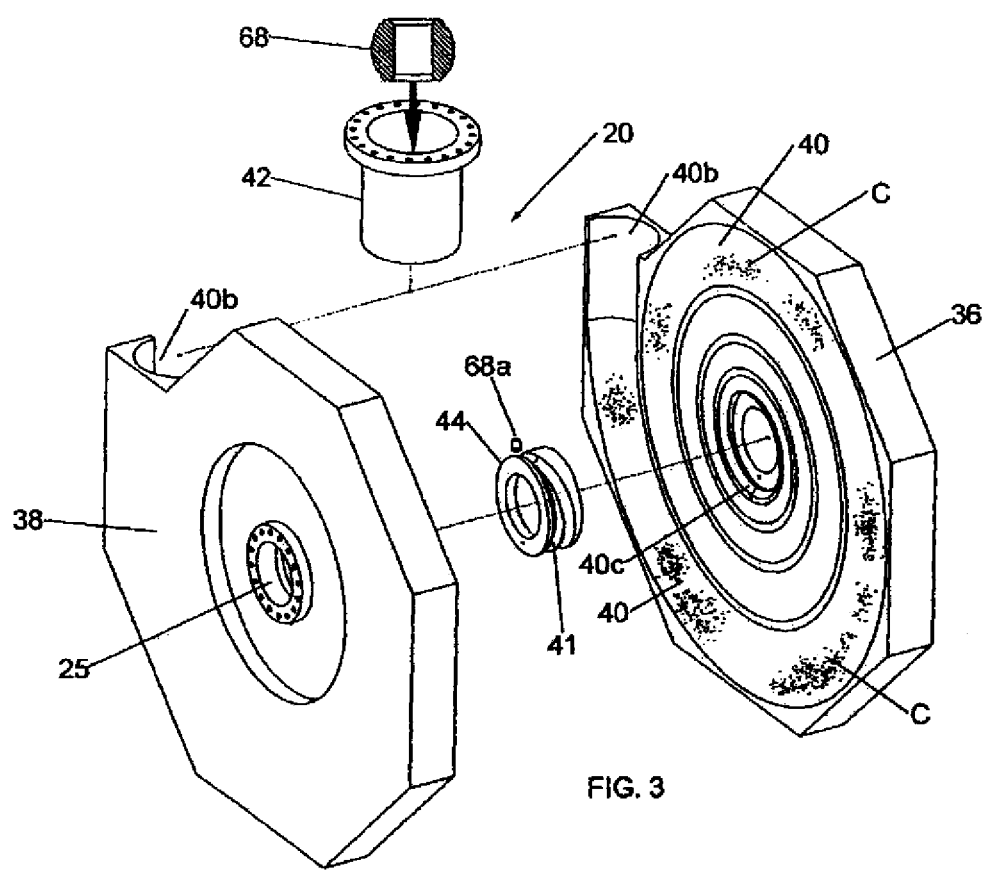
FIG. 3 is a generally perspective exploded view of the plasma compressor illustrated in FIG. 2.
Figure 4:
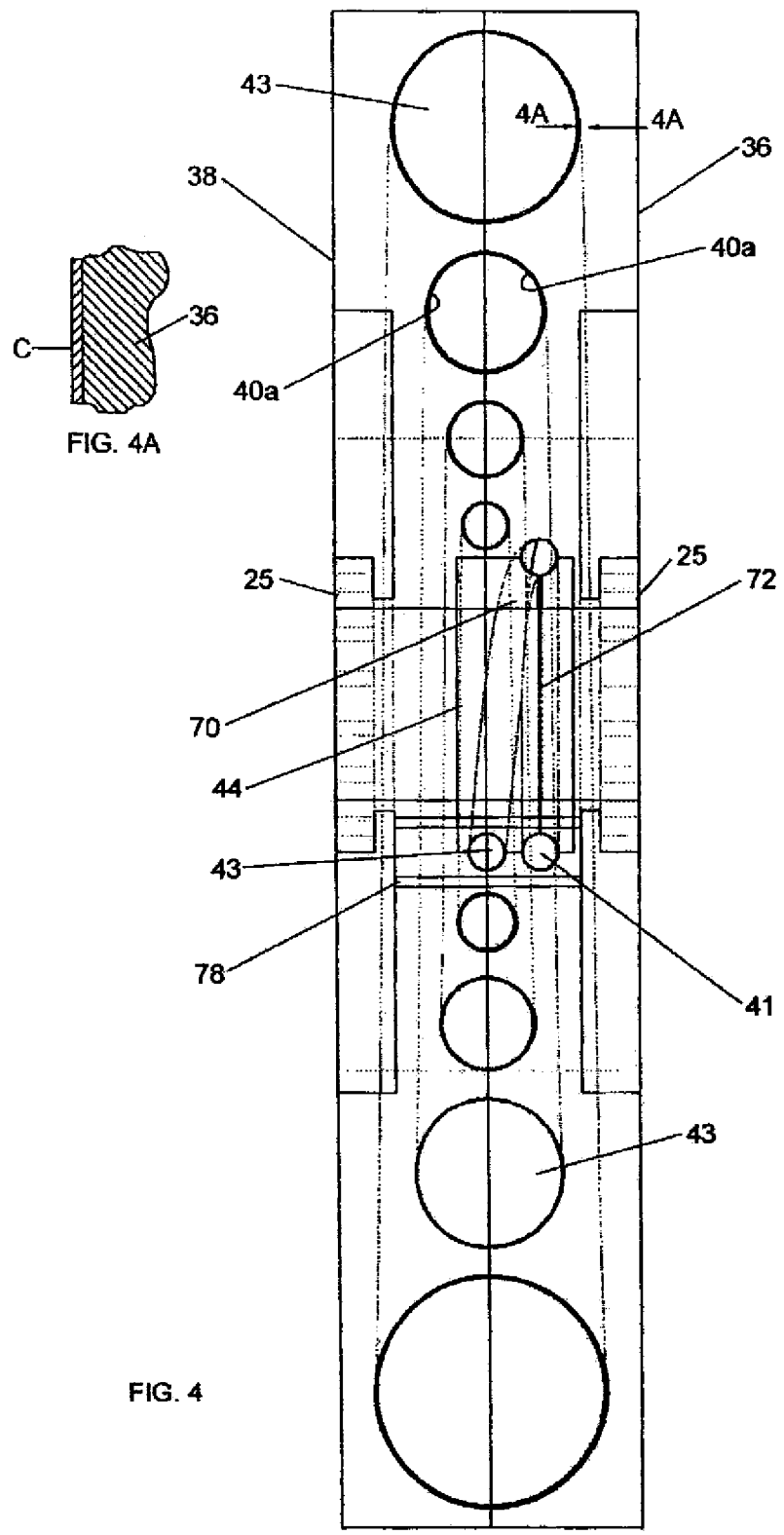
FIG. 4 is a longitudinal, cross-sectional view of the plasma compressor.

A highly unique feature of the apparatus of the present invention is the previously identified compressor 22, the details of construction of which are illustrated in FIGS. 2 through 4 of the drawings. In the present form of the invention, the plasma compressor 22 comprises first and second sealably interconnected portions 36 and 38 that are constructed from a material selected from the group consisting of aluminum, steel, copper, silicon, magnesium, carbon-carbon composites, nickel super alloys, tungsten, or other refractory alloys (such as molybdenum, niobium or rhenium). Preferably, portions 36 and 38 are formed using a conventional computer numerically controlled (CNC) machine, or a conventional electrical discharge machine (EDM), or by casting methods. As best seen in FIGS. 3 and 4 of the drawings, each of the portions 36 and 38 is provided with an elongate spiral passageway 40 having continuous wall 40a. Each of the spiral passageways has an inlet 40b and an outlet 40c (FIG. 3). Disposed proximate the center of the compressor 22 and in communication with the outlet of the spiral passageway is the important burn chamber 41, the construction and operation of which will presently be described.

Also forming a part of the compressor 22 is an inlet port component 42 and an inner ring 44 that is operably associated with the burn chamber 41. Inlet port component 42 is in communication with the inlet of the spiral passageway 43 (FIG. 4) that is formed when portions 36 and 38 are joined together in the manner illustrated in FIG. 2 of the drawings by brazing, welding, diffusion bonding, or mechanical assembly (with bolts and seals). As illustrated in FIG. 2, spiral passageway 43 is of progressively decreasing diameter with the smallest diameter of the passageway being in communication with the burn chamber 41. Both the inlet port component and the inner ring are also preferably formed from a material selected from the group consisting of aluminum, steel, copper, silicon, magnesium, carbon-carbon composites, tungsten, or other refractory alloys.

In order to avoid contamination of the plasma during the compression process, the wall of the elongated spiral passageway 40 of the compressor 22, as well as all other internal surfaces of the compressor that are exposed to the plasma, must be provided with a coating "C" preferably comprising either lithium-silicon, beryllium, or diboride ceramic, all of which are electrically conductive and low atomic-number materials (see FIGS. 3 and 4A). With respect to the lithium-silicon coating, it is to be noted that because pure lithium metal reacts with water vapor in the air, it is necessary that it be strictly maintained under vacuum between the point of manufacture of the coating powder and its application to the internal walls of the compressor. For certain applications, an electrically-conductive diboride ceramic or similar composite coating that consists of low atomic-number elements, which sputter slowly, could also advantageously be used to coat the internal walls of the compressor. The various techniques for coating the interior walls of the compressor are well known to those skilled in the art. For beryllium coatings, these techniques are fully described in a work entitled *Beryllium Chemistry and Processing*, Kenneth A. Walsh, Edgar E. Vidal, et al, ASM International (2009) (see particularly, Chapter 22, "Beryllium Coating Processes", Alfred Goldberg, pp. 361-399).

Once machined and properly coated, the inlet port component 42, the inner ring 44 and the inner walls of the compressor 22 that are exposed to the plasma are carefully cleaned and the various components of the compressor are joined together in the manner well understood by those skilled in the art, such as by brazing, welding, diffusion bonding, or mechanical assembly.

After further cleaning and leak checks, the compressor 22 is integrated with the other subsystems of the apparatus of the invention in the manner depicted in FIG. 1 of the drawings. These subsystems include the previously described vacuum pump subsystem 24, the wall-cleaning subsystem that comprises heater blankets 26a, a glow discharge cleaning (GDC) system 26b and an ion gettering pump 26c and the plasma source subsystem 28. After these various subsystems have been interconnected with the compressor and the completed system has been thoroughly tested, the prime-mover subsystem 34 is interconnected with the compressor 22 in the manner indicated in FIG. 1 of the drawings.

Prior to operating the apparatus of the invention, it is desirable to include a variety of well-known diagnostic tools around the apparatus (not shown in the drawings), such as a high-speed x-ray camera for observing shots, along with a neutron diagnostic, plus Rogowski coils for timing the ejection speed of the CT through the input port, as well as the speed of the CT in the burn chamber 41.

Figure 7:
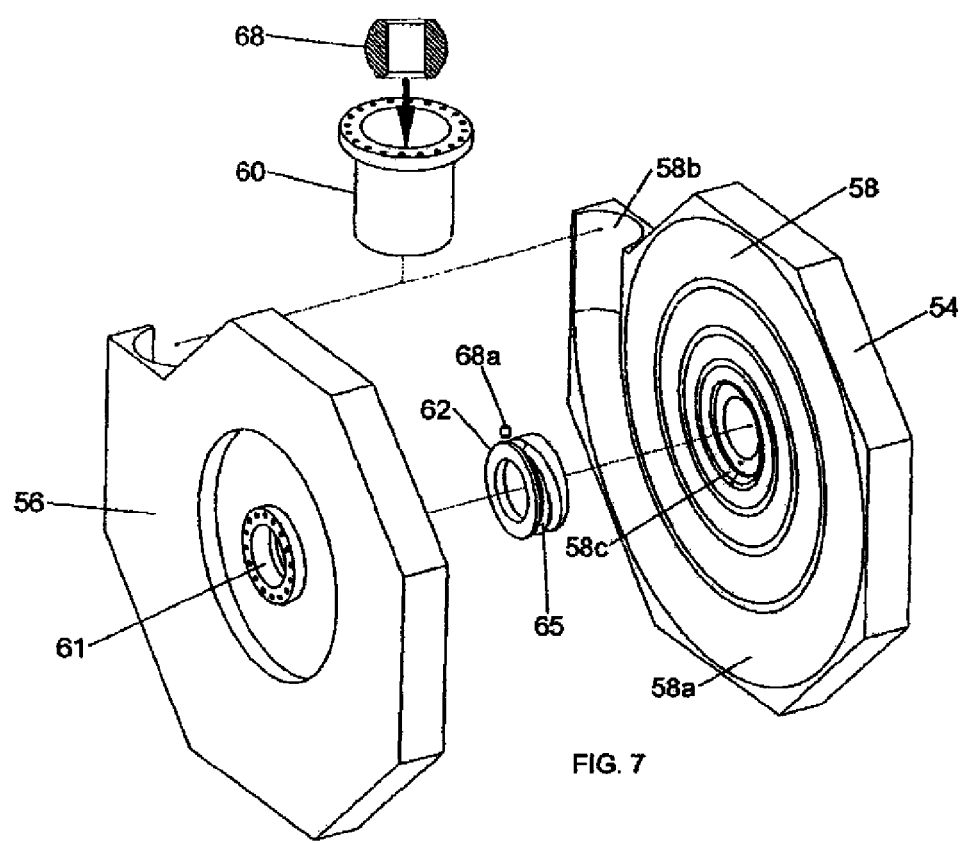
FIG. 7 is a generally perspective exploded view of the plasma compressor illustrated in FIG. 6.
Figure 8:
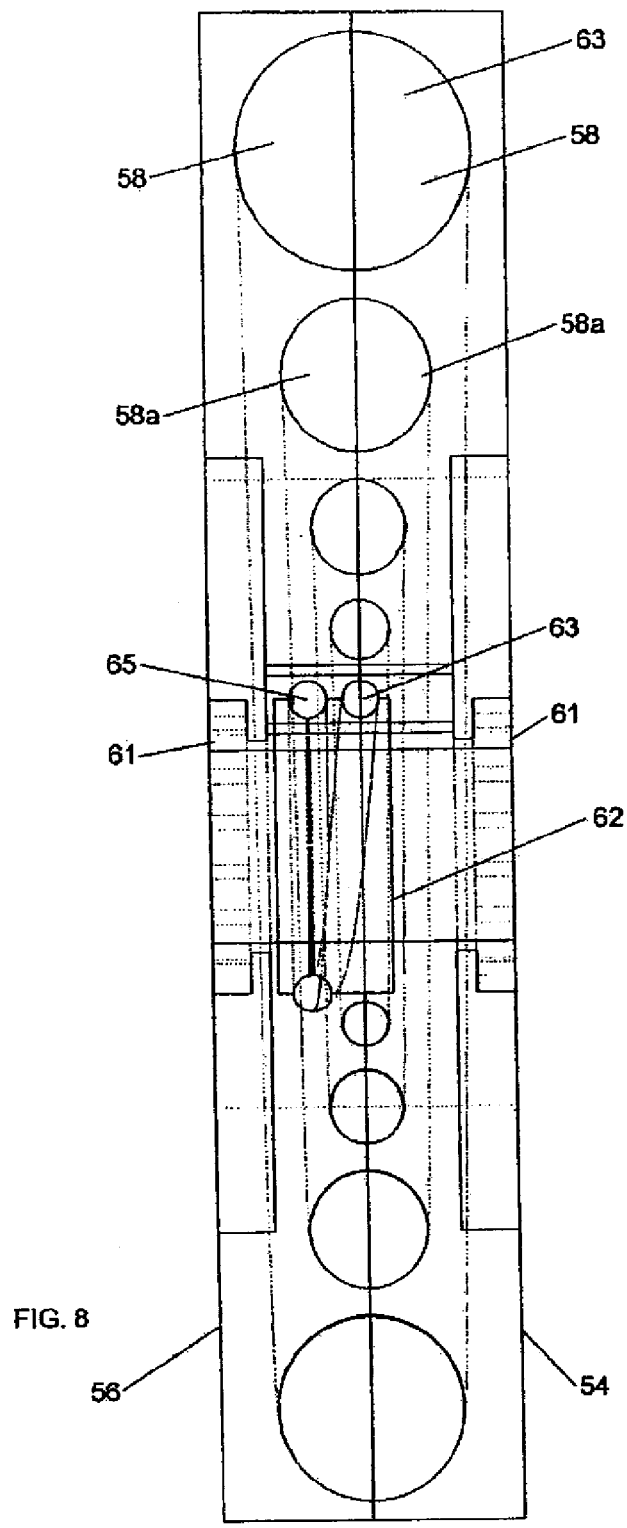
FIG. 8 is a longitudinal, cross-sectional view of the plasma compressor shown in FIG. 6.

Before considering the methods of the invention an alternate embodiment of the compressor unit will be considered. This alternate form of the compression unit is illustrated in FIGS. 6-9 of the drawings and is generally designated by the numeral 52. This embodiment is similar in many respects to the embodiment shown in FIGS. 1 through 5 and functions in a substantially identical manner. The primary difference between this latest embodiment of the invention and the previously described embodiment resides in the fact that the compressor is constructed from an electrically conductive, metallic alloy having a low atomic number, such as a beryllium alloy. More particularly, in this latest embodiment of the invention, portions 54 and 56 of the compressor unit 52 are formed from a block of beryllium alloy using a conventional computer numerically controlled (CNC) machine, or a conventional electrical discharge machine (EDM), or by casting method. As in the earlier described embodiment of the invention and as illustrated in FIGS. 7 and 8 of the drawings, each of the portions 54 and 56 is provided with an elongated spiral passageway 58 having continuous wall 58*a*. Each of the spiral passageways has an inlet 58*b* and an outlet 58*c* (FIG. 7).

Also forming a part of the compressor 52 is an inlet port component 60, outlet port component 61 and an inner ring 62, the functions of which are substantially identical to the functions of inlet port 42 and the inner ring 44 of the previously described embodiment. Both the inlet port component and the inner ring are also preferably formed from a low atomic number, electrically conductive material, such as a beryllium alloy. Once machined, the inlet port component 60, the inner ring 62 and portions 54 and 56 are carefully cleaned and connected together in the manner well understood by those skilled in the art, such as by brazing, welding, diffusion bonding, or mechanical assembly using bolts and seals. After portions 54 and 56 are fused together the elongated spiral passageways 58 formed in each of the portions cooperate to define a spiral passageway 63 (FIG. 8). As illustrated in FIG. 8, spiral passageway 58 is of progressively decreasing diameter with the smallest diameter of the passageway being in communication with the burn chamber 65. Disposed proximate the center of the compressor 52 and in communication with the outlet of the spiral passageway 63 is the important burn chamber 65 of this latest form of the invention, the construction and operation of which is substantially identical to the previously identified burn chamber 41.

Other candidate materials for use in constructing the compression structure 52 include Carbon-Carbon composites and refractory metal alloys (both higher atomic number materials than Beryllium).

The use of the beryllium alloy material in constructing the compressor is somewhat less desirable than the use of the more common materials such as steel, copper, silicon, magnesium, tungsten or other refractory alloys, all of which absorb x-rays better than beryllium. Additionally, the use of these materials is considerably less hazardous and the materials combine the function of a vacuum structural wall and x-ray shielding wall into one component.

It is to be understood that a variety of gasses, including but not limited to: hydrogen, deuterium, deuterium-tritium mixtures, pure tritium, helium-3, diborane and mixtures thereof can be used with the compression apparatus of the invention. In the case that the compression apparatus is used to compress a deuterium-rich gas to ignition and/or "burn" conditions, a portion of the burn ash will contain the rare gas helium-3. This is because the helium-3 generated from the reacted deuterium has a slower initial speed than other generated particles, such as tritium, and thus more easily thermalizes in the plasma. However, its nuclear fusion reaction rate is also slower than the tritium-deuterium reaction rate, such that it is not consumed as fast as the thermalized tritium. As a result of this breeding process, the ash from deuterium reactions accumulates the rare stable isotope helium-3.

In order to collect the helium-3, a filtration system attached to the vacuum pumps will need to separate the isotopes in the exhaust. This apparatus is used to collect and purify the helium-3, as well as other exhaust products (such as tritium) that should not be vented to atmosphere from the pump exhaust. Additionally, hydrogen-1 (protons) and helium-4 could be obtained from the exhaust using an isotopic separating filtration system.

The first step in carrying out the method of the present invention is to form a compact torus (CT) plasma structure. One type of CT is the Field Reversed Configuration (FRC). An FRC is formed in a cylindrical coil which produces an axial magnetic field. First, an axial bias field is applied, then the gas is pre-ionized, which "freezes in" the bias field, and finally the axial field is reversed. At the ends, reconnection of the bias field and the main field occurs, producing closed field lines.

Following the formation of the CT, unlike the previously identified prior art methods which involve the use of compact toroid compression mechanisms, the CT, which is identified in the drawings by the numeral 68, is launched at high speed into the inlet port component 42 of the plasma compressor of the invention. As will be discussed in greater detail in the paragraphs that follow, as the CT travels through the plasma compressor it is crushed against a low atomic number material wall of the elongated spiral by means of its own inertia, inducing heating by conservation of energy. The internal thermal energy of the CT increases as its kinetic energy decreases.

As the CT compresses against the walls of the spiral passageway 43, the pressure force it exerts has a vector component in the opposite direction to its forward motion (unless the walls are of constant cross-section). Therefore, it is important that the bulk axial kinetic energy of the CT at the point of ejection be greater than the design "target" thermal energy at the end of compression, to avoid a ricochet effect along the walls.

The wall of the spiral passageway 43, as well as the other walls of the plasma compressor into which the CT comes in contact, absorb a portion of the heat, the degree to which is significantly reduced by embedding a large magnetic field within the CT during formation, prior to ejection. A highly magnetized CT impedes both thermal conduction losses and particle diffusion losses from its core to the walls.

Once compressed to the design "target" thermal energy, the compressed CT 68*a* enters a comparatively short transfer conduit 70, which guides it away from the plane of symmetry of the compressor, and into the burn chamber 41. As previously discussed, the burn chamber comprises a toroidal ring of constant cross-section, with a single entrance port for the compressed CT 68*a* (FIGS. 3 and 7), and multiple smaller exhaust ports 72 (FIG. 5) which are in communication with the vacuum system 24.

Figure 5:
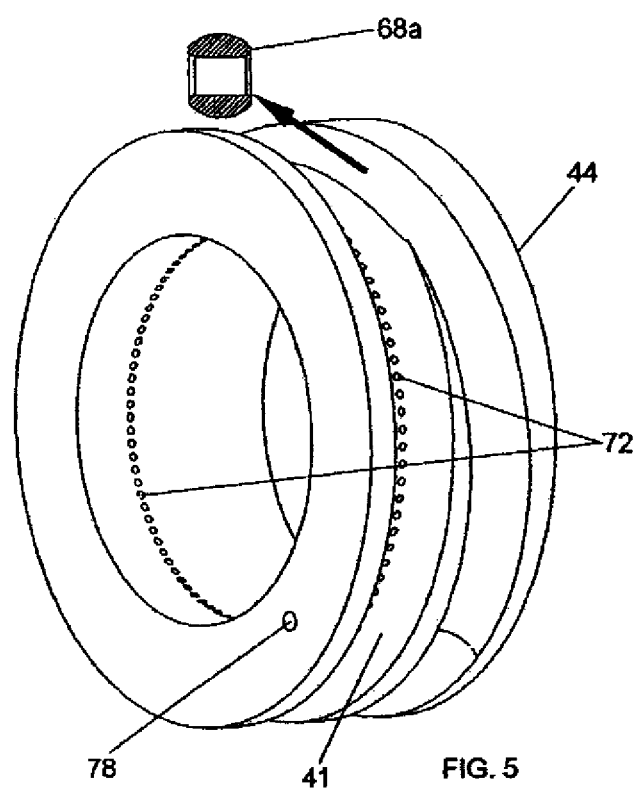
FIG. 5 is a generally perspective exploded view of the burn chamber of the plasma compressor illustrating the plasma in its compressed state.
Figure 6:
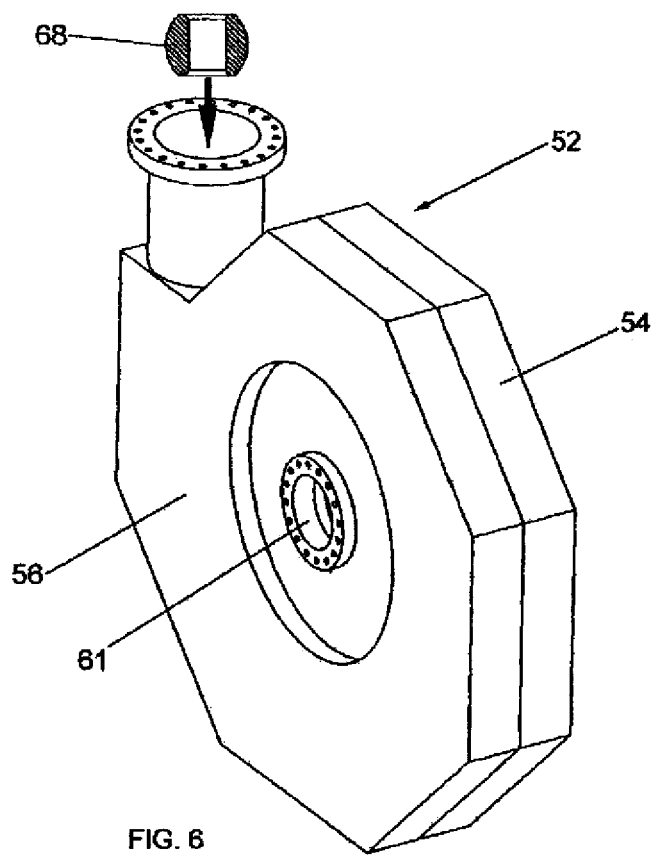
FIG. 6 is a generally perspective exploded view of an alternate form of the plasma compressor of the apparatus showing the plasma to be compressed in position to be introduced into the plasma compressor.
Figure 9:
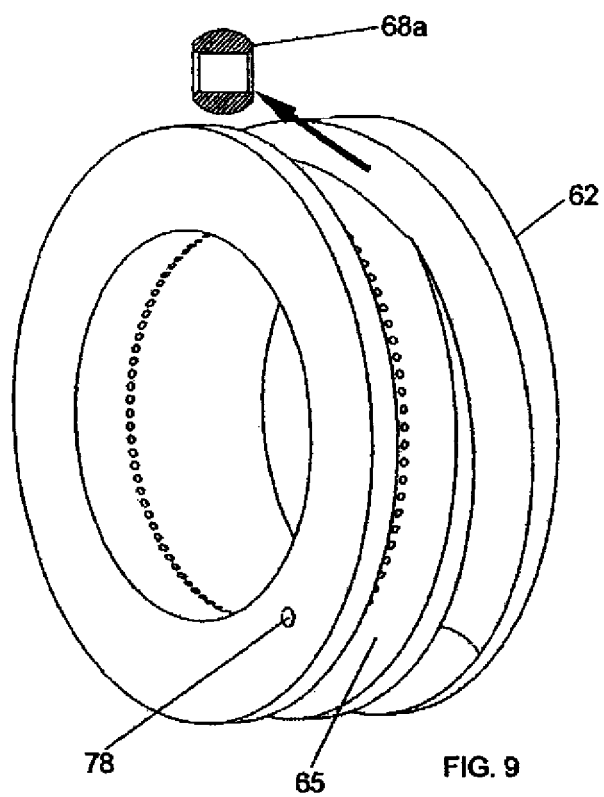
FIG. 9 is a generally perspective exploded view of the burn chamber of the plasma compressor of this latest form of the invention illustrating the plasma in its compressed state.

After the burn is complete, the compressed CT 68*a* dissipates into neutral gas, which is pumped out through the main vacuum exit port 74. Referring to FIGS. 5 and 9 of the drawings, it is to be noted that the inner ring is provided with a circular hole 78, which is adapted to receive an alignment gauge pin during assembly (not shown). After assembly, the alignment gauge pin is removed, leaving two through-holes that can be conveniently used for the insertion of diagnostic probes, such as a Rogowski coil loop.

A major advantage of the method of the present invention is that neutral beams are not necessary for heating the plasma, maintaining the compact toroid plasma thermal energy, or providing stability to the plasma structure. Another advantage of the method is that collapsible walls are not needed for compressing the plasma. Additionally, in practice, the compression apparatus of the invention can be used multiple times.

By way of background, in burning deuterium, which is an abundant stable-isotope of hydrogen, the reaction cycle consists of the following five equations:

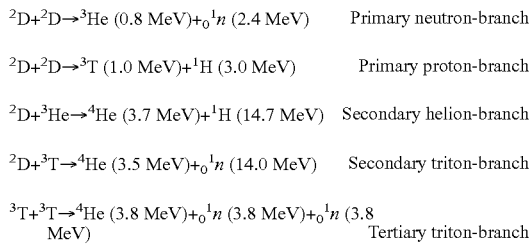

$^2D+^2D \rightarrow ^3He$ (0.8 MeV)$+_0^1n$ (2.4 MeV)　　Primary neutron-branch $^2D+^2D \rightarrow ^3T$ (1.0 MeV)$+^1H$ (3.0 MeV)　　Primary proton-branch $^2D+^3He \rightarrow ^4He$ (3.7 MeV)$+^1H$ (14.7 MeV)　　Secondary helion-branch $^2D+^3T \rightarrow ^4He$ (3.5 MeV)$+_0^1n$ (14.0 MeV)　　Secondary triton-branch $^3T+^3T \rightarrow ^4He$ (3.8 MeV)$+_0^1n$ (3.8 MeV)$+_0^1n$ (3.8 MeV)　　Tertiary triton-branch It is important to understand that in carrying out the method of the present invention, the wall of the spiral passageway, as well as any surface that the CT plasma structure comes in direct line-of-sight contact with, be clean, of low atomic number, and sputter slowly. These features will minimize losses due to impurities entering the plasma from the walls. In addition, it is beneficial for the walls to be electrically conductive, as this minimizes the loss due to synchrotron (cyclotron) radiation from the heated plasma by reflecting the emitted millimeter-wavelength light back into the plasma for re-absorption. This becomes apparent upon reviewing the fundamental equations governing the energy balance for the system.

The equation for the power gained by fusion reactions is:

$$\text{Fusion Gain } P_f = a_{12} n_1 n_2 \langle \sigma v \rangle \qquad\qquad A.1$$

The loss equations for electrons, ions, and particle transfer appear respectively in FIGS. 10, 11 and 12 of the drawings with all variables being as defined in the previously set forth symbol definition table.

A key observation, based on these equations, as well as prior experiment literature, is that avoiding impurity-driven losses is a crucial requirement for maintaining a hot plasma. To accomplish this, it is essential that the plasma not come into contact with high atomic number (high Z) materials, such as steel. The end-result of impurities in the plasma is that the loss rates increase by orders of magnitude. There are multiple loss paths due to high-Z contamination. The volumetric radiation power loss mechanisms that increase most significantly with Z are Bremsstrahlung, Recombination, and Excitation Line. However, the average Z also influences thermal conduction losses and even thermalization rates.

Bremsstrahlung radiation is strongly affected by the average ion charge Z of the plasma, as the multi-pole non-relativistic equation A.2 (FIG. 10) indicates. In addition to this equation, it is important to calculate both the dipole and relativistic versions of the Bremsstrahlung loss rate, as well as all the quantum-mechanical "gaunt factor" corrections for each ion species, before arriving at the dominant loss rate due to Bremsstrahlung radiation. Bremsstrahlung occurs in the x-ray spectrum and leaves the plasma. However, Bremsstrahlung is dominant only at high energy levels that are commensurate with burn conditions. For this reason, and the fact that the plasma is transparent to x-rays, Bremsstrahlung is usually the primary loss mechanism considered in simulation programs. At lower energy levels, which the plasma must pass through in order to get from a neutral-gas state to burn conditions, recombination and excitation line radiation dominate the plasma's radiative loss mechanisms. This is especially the case for high-impurity content plasma.

Recombination radiation, governed by equation A.3 (FIG. 10), is the loss most strongly affected by Z. As can be seen inside the integrand, recombination radiation is extremely sensitive to increases in Z. It can be orders of magnitude less than Bremsstrahlung for a pure hydrogenic plasma, but can rapidly exceed Bremsstrahlung at lower energy levels from even moderate impurity content. Thus, by controlling impurities, the recombination radiation loss mechanism can be minimized. Similarly, excitation line radiation in equation A.4 (FIG. 10) is affected by Z. Although not as apparent from this top-level equation, the calculation of $N_a$ utilizes a non-linear function with Z as a directly dependant variable.

Recombination and line radiation are often over-looked in sizing calculations, as they are assumed to be negligible as compared to Bremsstrahlung. This is the case under certain circumstances, but it is important to include their equations in case impurities enter the plasma. Overall, it is always beneficial (loss-reducing) to minimize the average Z. This is best accomplished by keeping impurities out of the plasma by utilizing clean, low-Z walls that sputter at as low a rate as possible.

In a clean, but non-magnetized plasma, the dominant loss mechanism is usually thermal conduction to the walls (equations A.6 and A.8—FIGS. 10 and 11), followed by particle diffusion (equation A.15—FIG. 12). Increasing the ambient magnetic field parallel to the walls inhibits these losses, but it also gradually increases the loss from Synchrotron radiation (equation A.5—FIG. 10). From simulations, a compact torus (CT) plasma can sustain several hundred Tesla before Synchrotron radiation exceeds the Bremsstrahlung radiation loss rate. This is because the plasma is highly absorbent to the millimeter-wave spectrum emitted by Synchrotron radiation and electrically-conductive walls efficiently reflect Synchrotron radiation, as well as the fact that Synchrotron radiation is not affected by Z.

Other losses included in the tables are ion Bremsstrahlung (equation A.10—FIG. 11) and ion Synchrotron (equation A.11—FIG. 11) radiation, which are comparatively minor to their electron counterparts in quasi-neutral plasmas. Neutral drag (equation A.9—FIG. 11) is also a comparatively small loss, but its inclusion enables prediction of how high a vacuum is required to sustain a moving plasma with negligible drag loss. Similarly, simulating sputtering of impurities from the wall (equation A.16—FIG. 12) and tracking magnetic dissipation (equation A.7—FIG. 10) allow estimation of how many impurities a wall will impart to a transient plasma and how long its internal magnetic field will last, respectively. The remaining effects of ion-to-electron kinetic transfer collisions (equation A.12—FIG. 11), product energy ion apportionment (equation A.13—FIG. 11), product energy ion thermalization (equation A.14—FIG. 12), and particle thermalization (equation A.17—FIG. 11) are essential to accounting for the allotment of energy and particles coming from core burn dynamics. In effect, they determine not the burn rate, but rather how to apportion the fusion energy coming from the original gain equation A.1, given the state of the plasma as instigated by an external device.

Once the governing equations are accounted for, it is possible to perform an optimization of the parameters for the method of the invention. By way of example, for deuterium gas, a convenient diameter for the starting and ending CT is 137 and 19 millimeters, respectively. The initial embedded magnetic field is preferably on the order of 6±1 Tesla and the minimum initial plasma ion density is approximately $5 \times 10^{15}$ particles per cubic centimeter. For optimum performance, the ejection speed of the CT requires a minimum of $4.8 \times 10^6$ meters per second and the minimum amount of time required for compression is on the order of 2 microseconds.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

The invention claimed is:

1. A method for compressing plasma to a high energy state using a plasma compressor having a plasma inlet, a burn chamber and a spiral passageway of progressively decreasing diameter having a continuous wall and interconnecting said plasma inlet and said burn chamber, said method comprising the steps of:
    (a) introducing the plasma into the plasma inlet; and
    (b) causing the plasma to travel along the spiral passageway toward the burn chamber in a manner to adiabatically heat the plasma by body force compression against the wall of the spiral passageway to a temperature sufficient to achieve nuclear fusion.

2. A method for accomplishing a nuclear fusion reaction using a plasma compressor having a plasma inlet, a burn chamber and a spiral passageway of progressively decreasing diameter, having a continuous wall interconnecting said plasma inlet and said burn chamber, said method comprising the steps of:
    (a) forming a compact toroid plasma;
    (b) introducing the compact toroid plasma structure into the plasma inlet;
    (c) causing the plasma to travel along the spiral passageway toward the burn chamber in a manner to adiabatically heat the field reversed configuration by body force compression against the wall of the spiral passageway to form a compressed plasma at a temperature sufficient to achieve nuclear fusion; and
    (d) dissipating said compressed plasma from the burn chamber.

3. The method as defined in claim 2 in which the starting diameter of said compact toroid plasma structure is about 137 millimeters and the ending diameter of said compact toroid is about 19 millimeters.

4. The method as defined in claim 2 in which the minimum initial plasma density of said compact toroid plasma structure is approximately $5 \times 10^{15}$ particles per cubic centimeter.

5. The method as defined in claim 2 in which the compressed plasma is ejected from the spiral passageway into the burn chamber at a minimum speed of $4.8 \times 10^6$ meters per second.

6. The method as defined in claim 2 in which the plasma is caused to travel along the spiral passageway and into the burn chamber in a period of time of about 2 microseconds.

* * * * *